June 23, 1942.                G. F. HARDIN                2,287,612
ILLUMINATING DEVICE FOR AIRPLANE LANDING FIELDS
Filed March 13, 1940                2 Sheets-Sheet 2
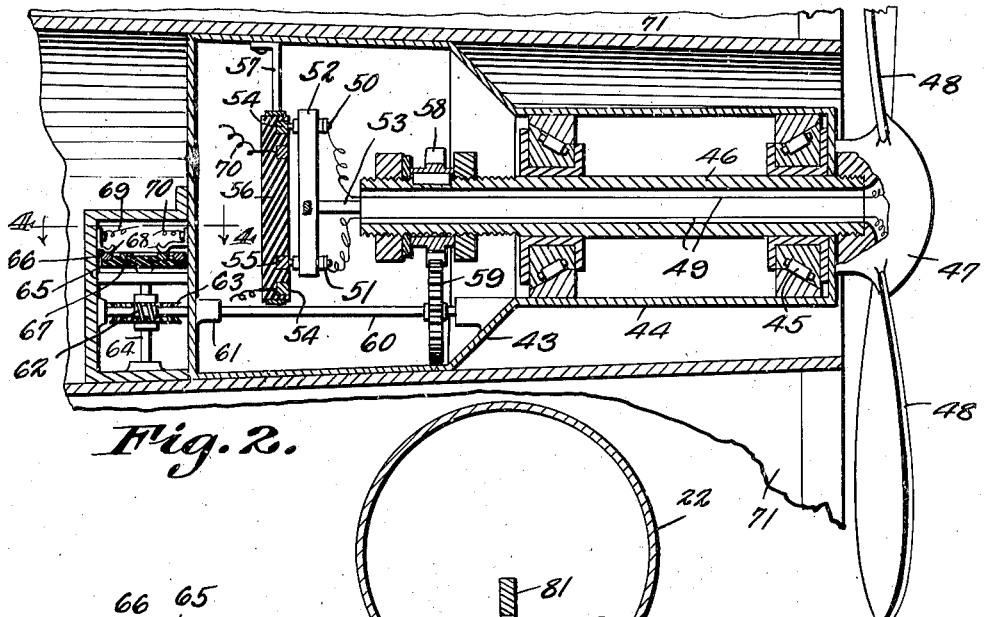
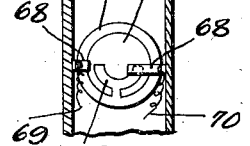
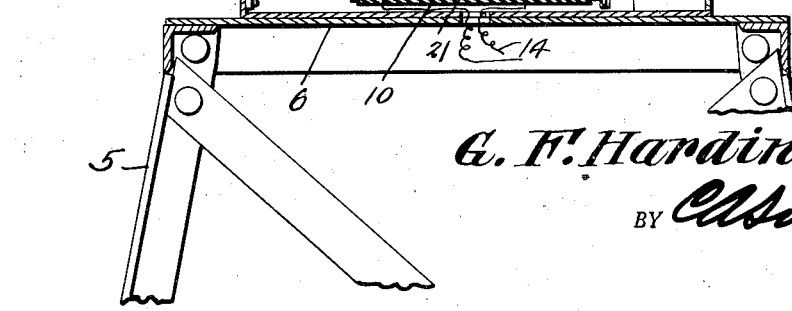
G. F. Hardin INVENTOR.
ATTORNEYS.

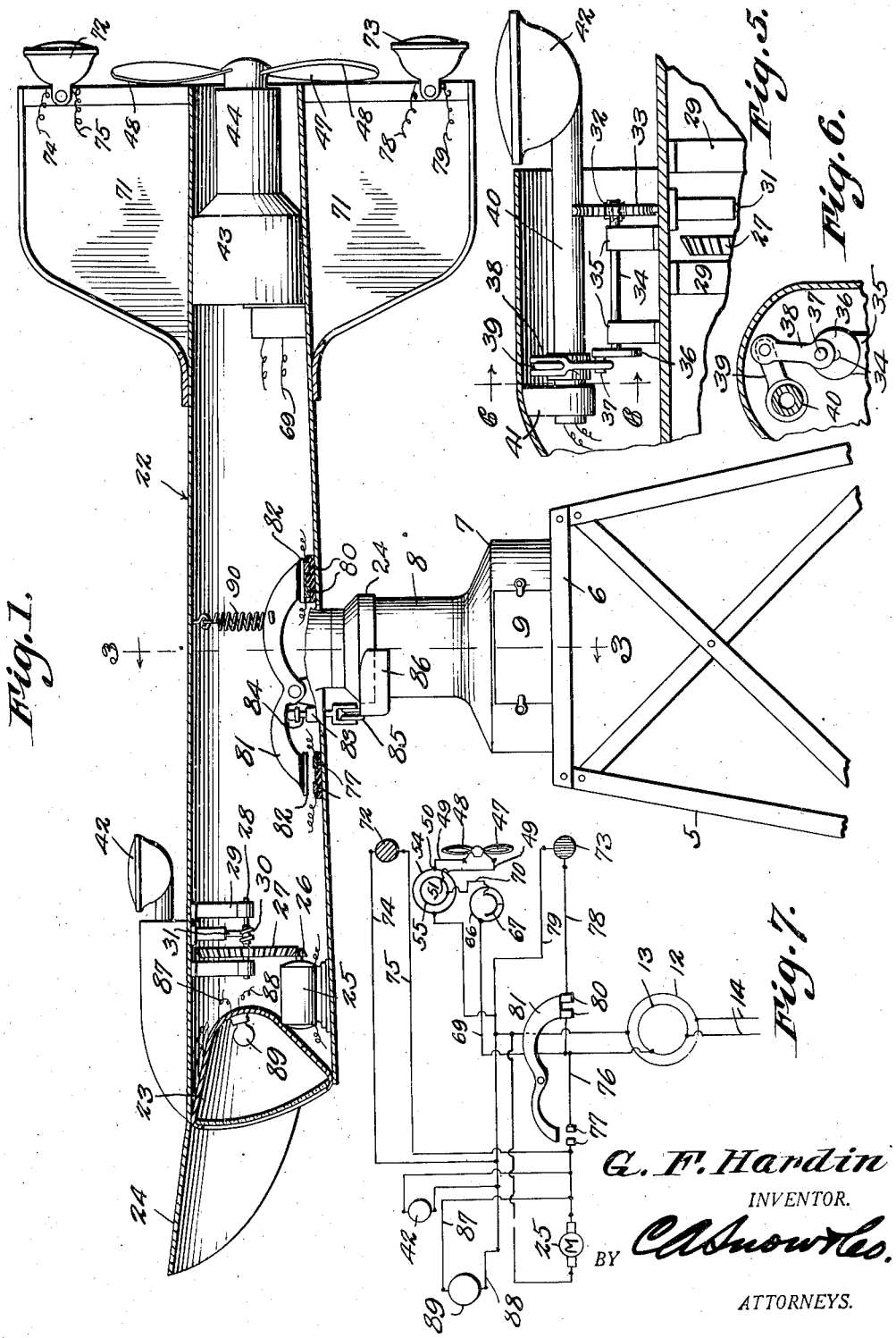

Patented June 23, 1942

2,287,612

UNITED STATES PATENT OFFICE 2,287,612

ILLUMINATING DEVICE FOR AIRPLANE LANDING FIELDS

George F. Hardin, McKenzie, Tenn.

Application March 13, 1940, Serial No. 323,802

1 Claim. (Cl. 177—352)

This invention relates to an illuminating device for use in illuminating airplane landing fields, the primary object of the invention being to provide illuminating means which will operate to direct light rays across the landing field to insure the illumination of the field to facilitate the landing of airplanes.

An important object of the invention is to provide an illuminating device of this character which will automatically move with the change of wind to direct light rays in a direction opposite to the direction of travel of the wind so that a pilot may maneuver his airplane to a safe landing into the wind.

A further object of the invention is to provide means for controlling the lamps of the device so that when the illuminating lights are inactive, certain of the red lights of the illuminating devices are lighted, indicating the direction of travel of the wind.

Another object of the invention is the provision of means on the illuminating device to indicate to airplane pilots, the velocity of the wind to insure a perfect landing into the wind.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of the tower or support on which the device is mounted, the body portion of the device being shown in longitudinal section.

Figure 2 is a longitudinal sectional view through the rear end of the body portion of the device.

Figure 3 is a sectional view taken on line 3—3 of Figure 1.

Figure 4 is a sectional view taken on line 4—4 of Figure 2.

Figure 5 is a longitudinal sectional view through the oscillating search light support.

Figure 6 is a sectional view taken on line 6—6 of Figure 5.

Figure 7 is a diagrammatic view illustrating the circuits used in connection with the lamps of the device.

Figure 8 is a sectional view taken on line 8—8 of Figure 3.

Referring to the drawings in detail, the device embodies a support or a tower indicated by the reference character 5, which is of any desirable height and construction. At the upper end of the tower is a platform 6 on which the body portion of the device is mounted.

The body portion includes a base 7 and a tubular casing 8 rising therefrom. An opening is formed in the base 7, the opening being normally closed by means of the closure 9, so that ready access to the interior of the base may be had, to repair or replace parts of the device.

Mounted within the base 7 is a disk 10 constructed of insulating material, the disk 10 being mounted on the brackets 11 that are shown as secured to the inner surface of the base 7. This disk 10 provides a support for the contact rings 12 and 13 that are embedded therein, and which are in circuit with a suitable source of electricity supply, through the wires 14.

Roller bearings 15 are mounted in the tubular casing 8, and provide a support for the tubular shaft 16 that has its ends threaded as at 17. Spring arms indicated at 18 are secured to the lower end of the shaft 16, by means of the nuts 19, the lower ends of the spring arms 18 being embedded in the bar 20 which is constructed of insulating material. This bar 20 is so arranged with respect to the spring arms 18, that one end of the bar overlies the outer contact ring 12, while the opposite end thereof overlies the contact ring 13. Brushes indicated at 21 are carried at the ends of the bar 20 to contact with the rings 12 and 13. Due to this construction, it will be seen that as the spring arms 18 rotate, the brushes 21 will wipe the contact rings 12 and 13, so that electric energy supplied to the rings, may be taken off through the brushes and wires connected therewith.

The body portion of the device which is indicated generally by the reference character 22 is tubular, and as shown, one end thereof is of a greater diameter than the opposite end, the larger end being designated as the forward end of the body portion, since it provides the support for the lamp housing, which is indicated at 23.

Depending from the body portion 22, at a point substantially intermediate the ends thereof, is a supporting post 24 which is constructed to fit over the upper end of the tubular casing 8 in a manner to exclude foreign matter from the tubular casing 8, but at the same time permit of free rotary movement of the supporting post and body portion supported thereby.

The forward end of the body portion is constructed to provide a hood 24' to protect the lens of the lamp, and to direct light rays downwardly onto the landing field.

Mounted within the body portion adjacent to the lamp housing 23 is a motor 25, the shaft of which is provided with a pinion 26 that meshes with the gear 27 supported on the shaft 28 that in turn is mounted in bearings formed at the lower ends of the arms 29. A worm gear 30 is also mounted on the shaft 28 and meshes with a gear formed at the lower end of the vertical shaft 31. This shaft 31 extends through an opening in the body portion 22 and is provided with a gear at its upper end indicated at 32, the gear meshing with the gear 33 mounted on one end of the shaft 34. The shaft 34 is mounted in bearings 35 that are supported on the body portion.

A disk indicated at 36 is mounted on one end of the shaft 34 and is provided with a pin 37 disposed eccentrically thereon. Connected with the pin 37 is a link 38 that connects with the arm 39 that in turn is secured to the shaft 40 mounted in bearing 41, the shaft 40 providing a support for the lamp housing 42 which is so disposed that the light rays from the lamp are directed upwardly. Thus it will be seen that when the motor 25 is in operation, the lamp housing 42 will be oscillated producing an oscillating light to attract attention.

Positioned in the rear end of the body portion 22, is a housing 43 formed with an elongated end portion 44 in which the bearings 45 are positioned, the bearings 45 providing a support for the tubular shaft 46 that extends beyond the rear end of the body portion 22 as clearly shown by Figure 2 of the drawings. On the extended end of the shaft 46 is a propeller-shaped member 47 that provides a support for the neon tube 48 that surrounds the blades of the member 47. The wires providing the circuit to the neon tube are indicated at 49 and extend through the tubular shaft 46, where they connect with the brushes 50 and 51 respectively, the brushes being mounted on the bar 52. This bar 52 is mounted at one end of a yieldable support that embodies spring arms 53 that in turn are secured to the tubular shaft 46 and curve downwardly therefrom. As shown by Figure 2 of the drawings, the bar 52 is also mounted on the spring arms 53 so that there is a long end and a short end, with the result that the brush supported by the long end will contact with the contact ring 54 or outer contact ring, while the brush 51 will engage or wipe the inner contact ring 55. These contact rings 54 and 55 are embedded in the insulating disk 56 that is mounted on the arms 57, secured within the housing 43. Mounted on the shaft 46 is a gear 58 that is in mesh with the gear 59 mounted on the shaft 60, which shaft extends through the bearing 61 and carries the worm gear 62. This gear 62 meshes with the gear 63 mounted on the shaft 64 disposed vertically within the body portion of the device, the upper end of the shaft 64 providing a support for the disk 65 constructed of insulating material. This disk 65 provides a support for the outer contact ring 66 and inner contact member 67. Contact arms 68 wipe the outer and inner contact rings 67 to take off electric current from the contact rings. These contact members are in circuit with a source of electricity supply, through the wires 69. The contact arms are in circuit with the brushes 50 and 51, through wires 70. Thus it will be seen that due to this construction, when the member 47 rotates, rotary movement will be imparted to the disk 65. As shown by Figure 4 of the drawings, the inner contact member 67 is semicircular, so that as the disk rotates, the contact arm 68 in wiping this contact member will cause the circuit to be intermittently made and broken. Since these contact members 68 and 69 control the electric circuit passing to the neon tube, it will be seen that the neon tube will be intermittently flashed, and since the propeller-shaped member 47 is rotated by wind pressure, the velocity of the wind can be determined by the speed of rotation of the member 47, which as before stated is illuminated by the neon tube.

Mounted at the rear end of the body portion 22 are upper and lower blades 71 arranged so that the body portion will operate much in the same manner as a weather vane with the result that the forward end of the body portion will be held into the wind at all times. These blades 71 provide supports for the lamps 72 and 73 the circuit to the lamp 72 being made through the wires 74 and 75 that are in circuit with the wire 76. A switch member 77 is in circuit with the lamp 72, as clearly shown by Figure 7 of the drawings. The circuit to the lamp 73 is made through the wires 78 and 79. A switch 80 is in the circuit with the lamp 73 for controlling the lighting of the lamp 73.

Pivotally mounted within the body portion 22 at a point substantially intermediate the ends thereof is an arm 81 that has downwardly extended ends carrying contact members 82, the arm being so arranged that the contact member at one end thereof will bridge the switch member 77 completing the circuit to the green lamp 72, while the contact member 82 at the opposite end of the arm will move to bridge the switch member 80, completing a circuit to the lamp 73.

Mounted for vertical sliding movement through the bearing 83, is a vertical shaft 84 that carries the roller 85 at its lower end, the upper end of the shaft being secured to the arm 81. Secured to the tubular portion 8 of the base, is a flange 86 that has its upper edge constructed to provide a cam surface over which the roller 85 moves. The arrangement of this cam is such that when the body portion 22 is positioned so that the lamp in the lamp housing 23 will illuminate the landing field, the lamp 72 will be lighted, since the lamp 72 and lamp within the lamp housing 23, are in circuit, there being provided wires 87 and 88 leading from the lamp 89 within the lamp housing 23. It might be further stated that the lamp 72 is green in color, and the lamp 73 is red. When the body portion 22 is moved to a position reverse from that shown in Figure 1, the circuit to the lamps 72 and 89 will be broken, and the circuit to the lamp 73 will be completed. A coiled spring indicated at 90 is connected to one end of the arm 81 and tends to normally raise one end of the arm. As the roller 85 moves off of one end of the cam surface of the flange 86, the spring 90 will act to elevate the end of the arm 81 bridging the switch members 80, and breaking the circuit to the red lamp 73.

Upon further rotary movement of the body portion, or a movement of the body portion to cause the roller 85 to move again over the cam surface of the flange 86, the arm 81 will be tilted in the opposite direction breaking the circuit between the switch members 77, and completing the circuit at 80. Due to these automatic signals, an aviator may readily determine the direction of the wind travel, as well as the velocity of the wind.

In the use of the device, it is contemplated to use a tower supplied with an illuminating device at each end of the landing field, or at each of the four sides of the landing field, so that when the devices are rotated by the wind, there will be light rays projected over the landing field from one or more of the illuminating devices, the opposite illuminating devices displaying the red rear lights of the devices while the illuminating lamps at the front ends thereof are dark. With this arrangement, it will be obvious that an aviator making a landing, can readily determine the direction of air travel as well as the velocity of the air.

What is claimed is:

An illuminating device for airplane landing fields, comprising a tower, a lamp support mounted for a horizontal rotary movement at the upper end of the tower, a weather vane on the support moved by the action of wind pressure against the vane rotating said support, a lamp at the front end of the lamp support adapted to illuminate the landing field, distinctive signal lamps mounted at the rear end of the lamp support, electric circuits for the lamps, and means to close the circuit to one of said signal lamps and the lamp at the front end of the support in one position of the support, and means responsive to rotation of the support to open said circuit and close the circuit to the other signal lamp.

GEORGE F. HARDIN.